United States Patent [19]

Eash

[11] 4,443,139
[45] Apr. 17, 1984

[54] POSITIVE FEED DRILL

[75] Inventor: Joseph D. Eash, Euless, Tex.

[73] Assignee: In-Tex Tool Corporation, Arlington, Tex.

[21] Appl. No.: 359,247

[22] Filed: Mar. 18, 1982

[51] Int. Cl.³ .................... B23B 39/10; B23B 47/22
[52] U.S. Cl. .................................... 408/14; 408/130
[58] Field of Search ............... 408/14, 130, 134, 11, 408/10; 173/168, 169, 9

[56] References Cited

U.S. PATENT DOCUMENTS

| 3,487,729 | 1/1970 | Juhasz et al. | 408/14 |
| 4,111,590 | 9/1978 | Burkart et al. | 408/130 X |
| 4,182,588 | 1/1980 | Burkart et al. | 408/14 |
| 4,329,092 | 5/1982 | Ponitzsch | 408/11 |
| 4,371,297 | 2/1983 | Hirose | 408/130 |

FOREIGN PATENT DOCUMENTS

| 242110 | 5/1960 | Australia | 408/130 |
| 933417 | 4/1948 | France | 408/130 |
| 519990 | 3/1955 | Italy | 408/130 |
| 175695 | 6/1961 | Sweden | 408/130 |

Primary Examiner—William R. Briggs
Attorney, Agent, or Firm—George A. Gust

[57] ABSTRACT

A positive feed drill has an elongated spindle mounted for reversible longitudinal motion in a drill housing. The spindle has a hexagonal cross-section with the apices of the hexagon being threaded. A toothed drive gear having a hexagonal aperture centrally thereof has a close sliding fit with the spindle for imparting rotation thereto. A feed gear threadedly engages the spindle apices and is selectively rotated at a different rotational speed than the drive gear to correspondingly longitudinally advance and retract the spindle. A pneumatic circuit provides completely automatic drilling to an adjustable depth and a positive retraction of the spindle. This circuit is novel in that it is contained internally within certain of the drill frame members.

19 Claims, 38 Drawing Figures

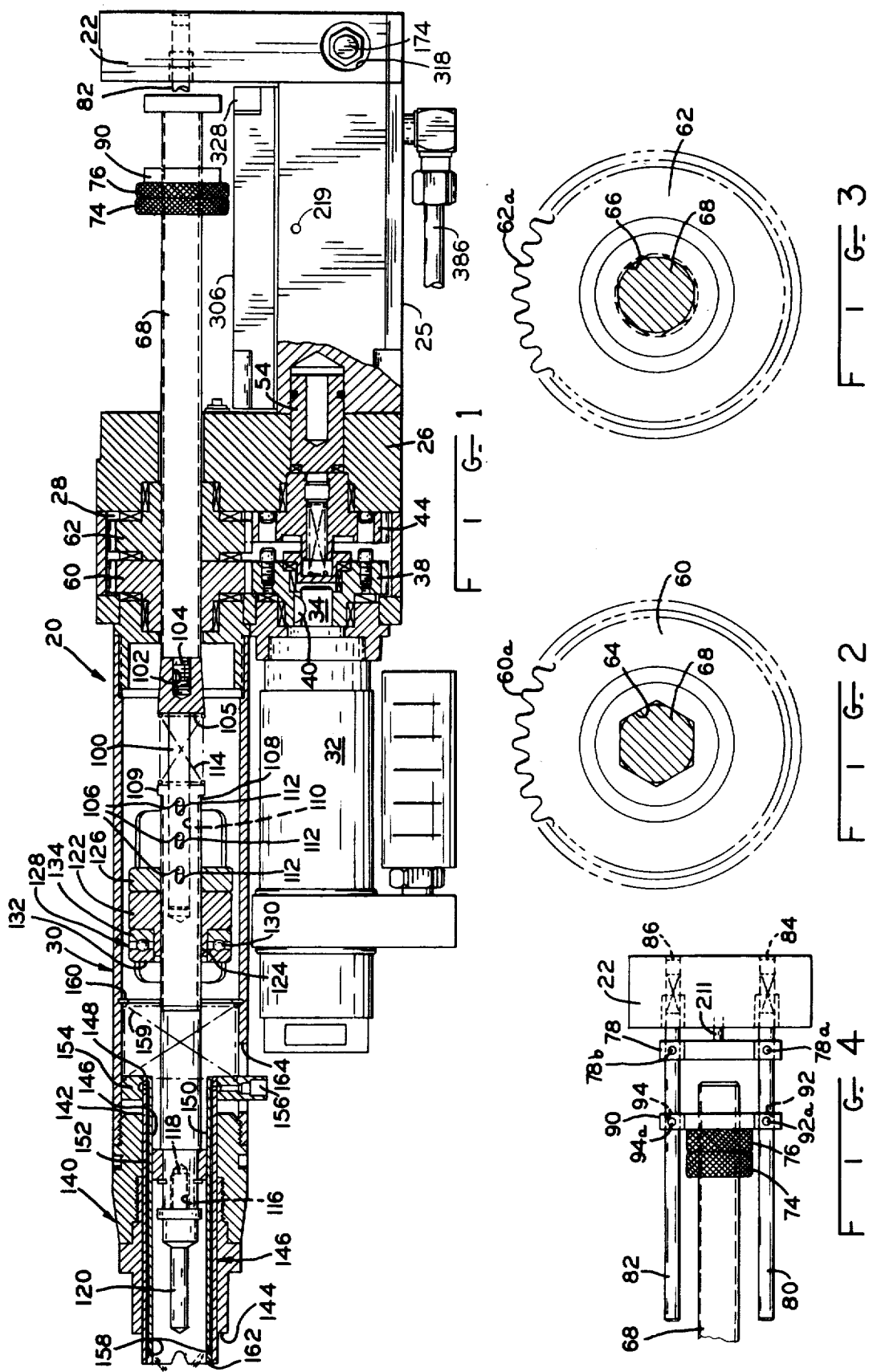

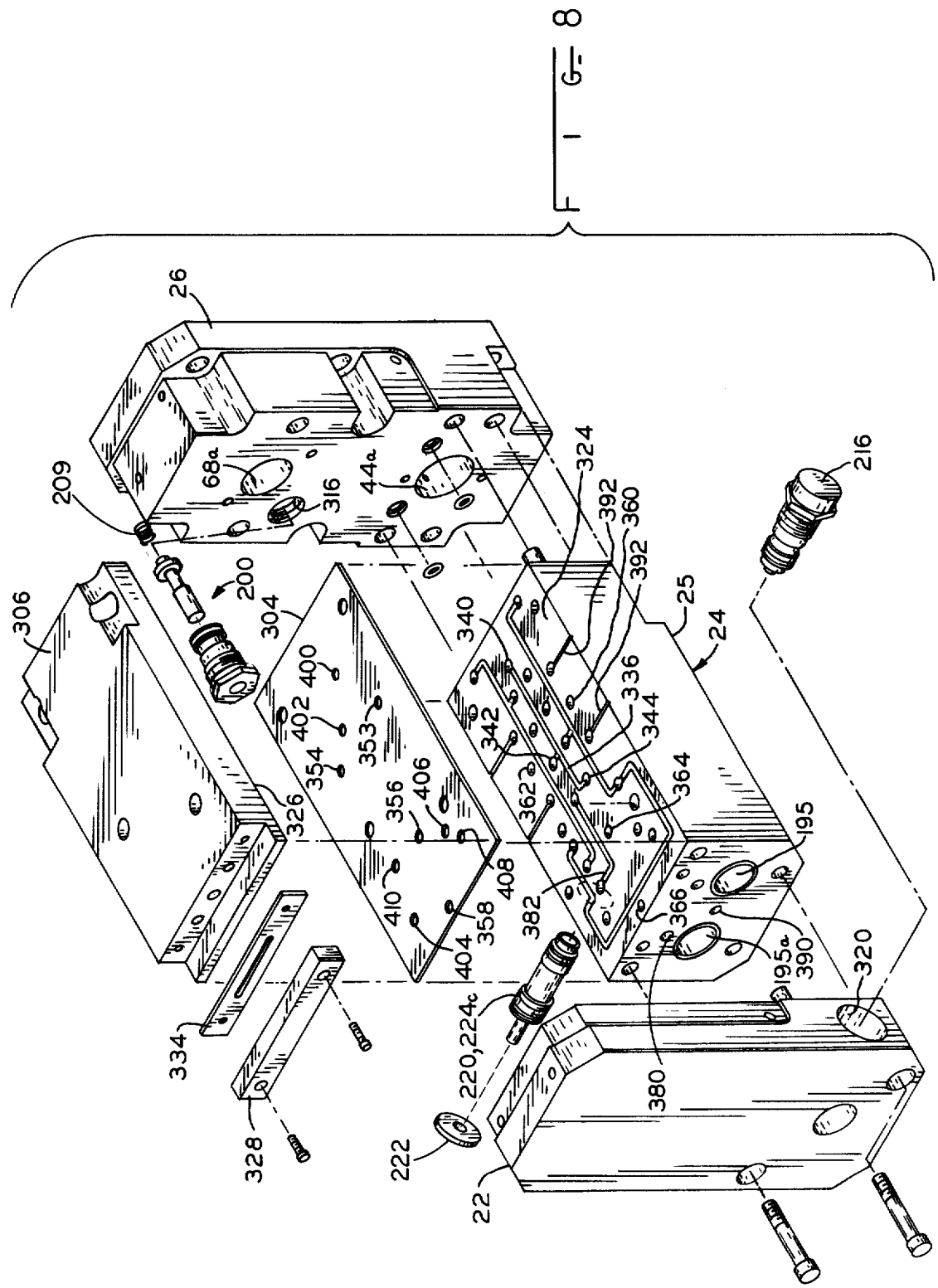

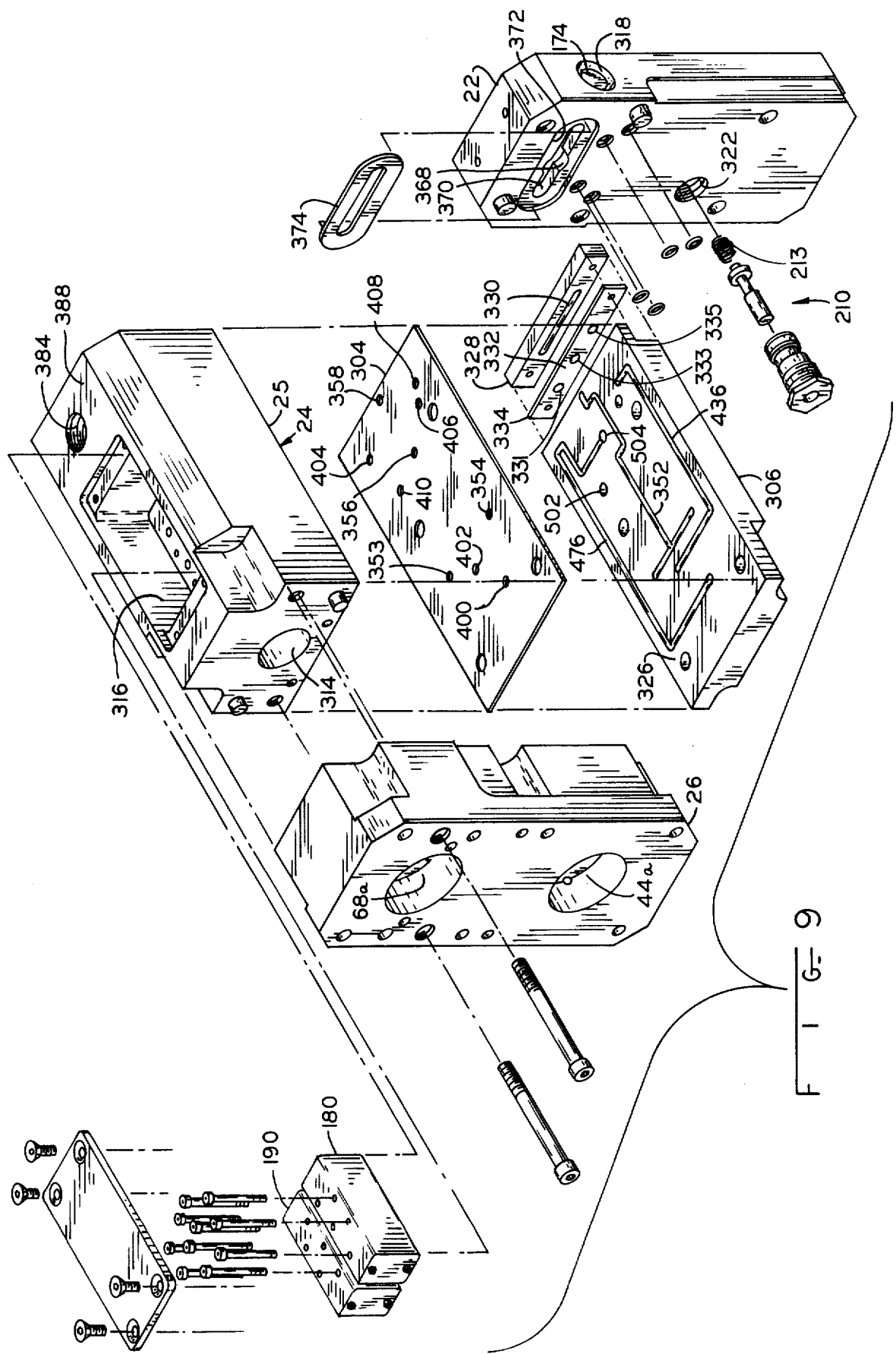

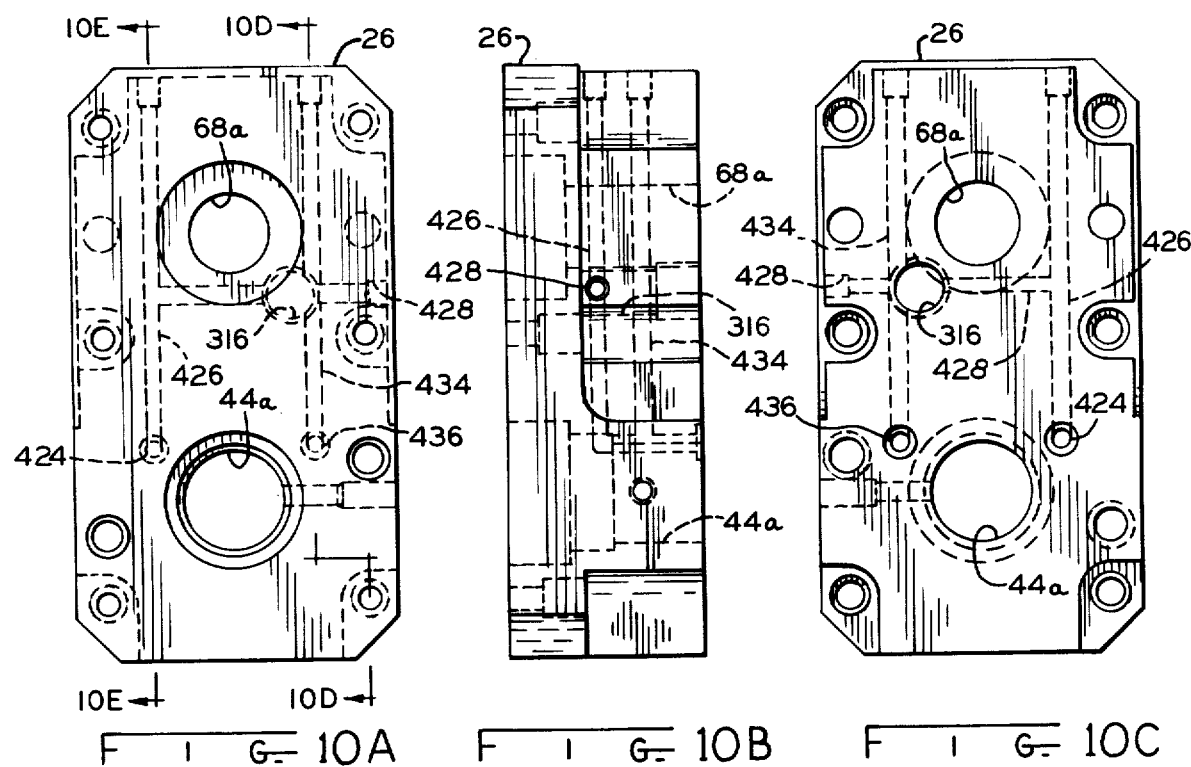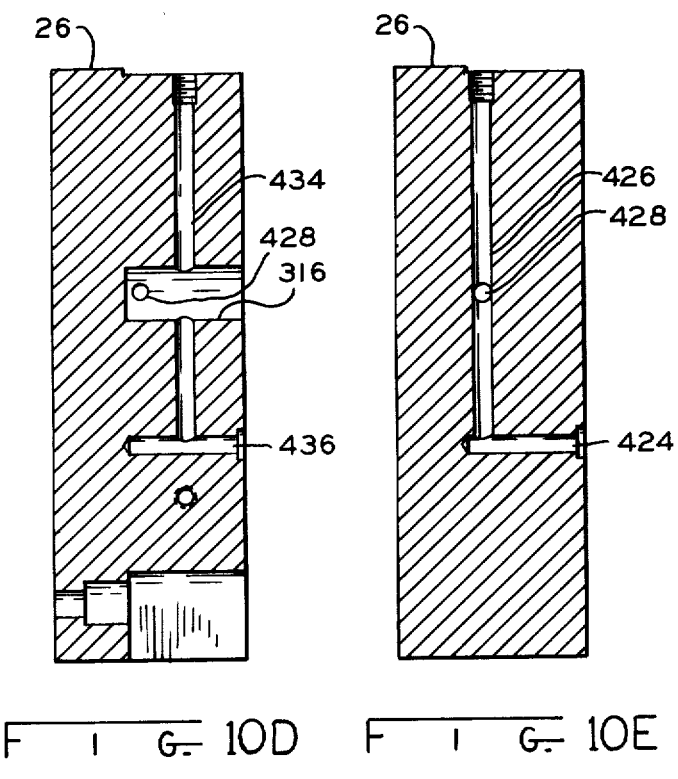

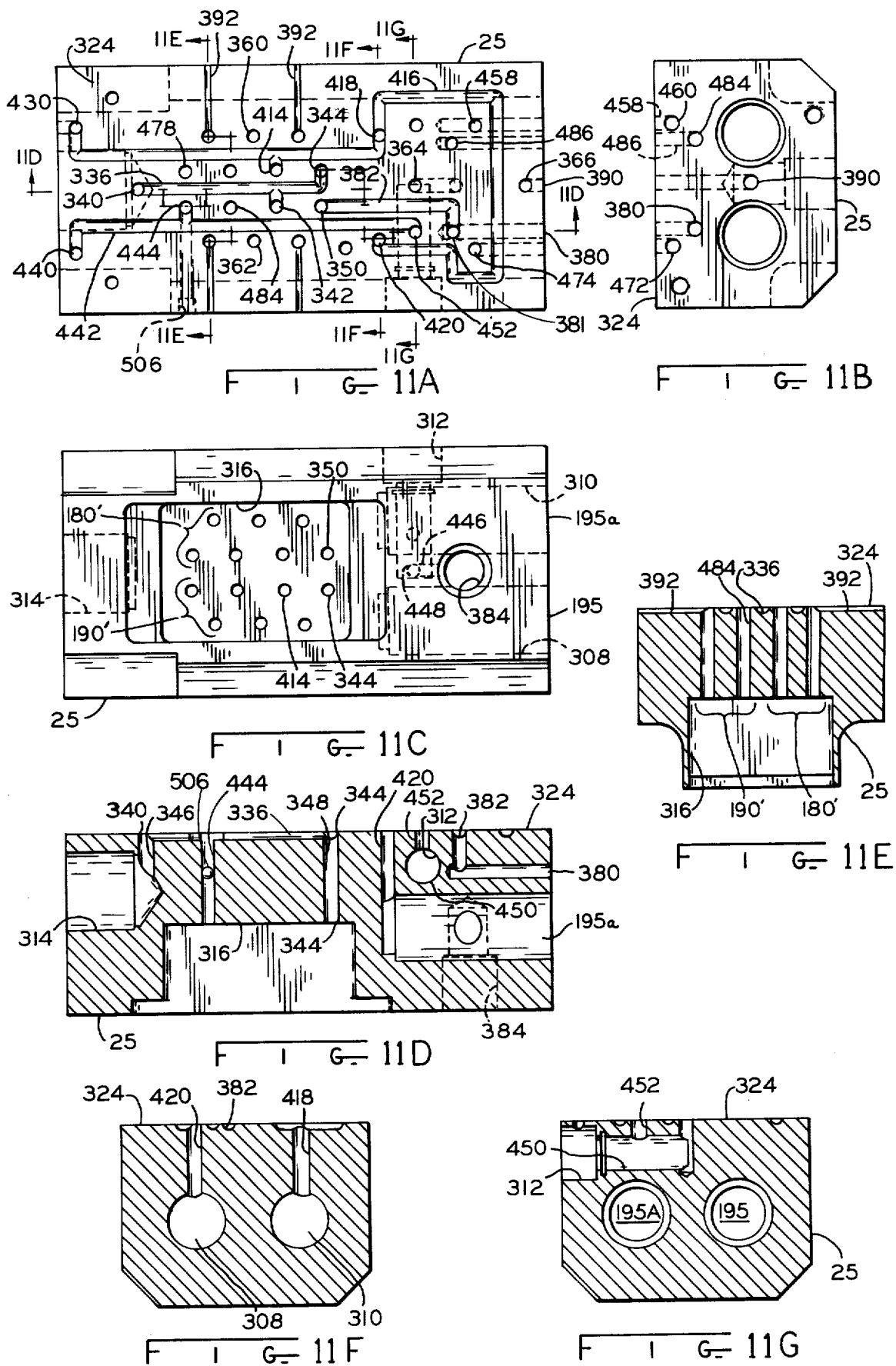

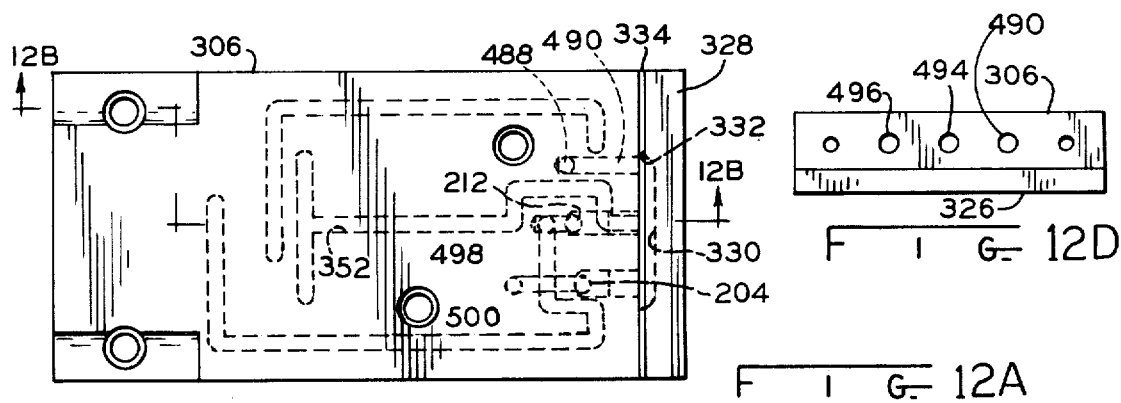
FIG. 12A
FIG. 12D
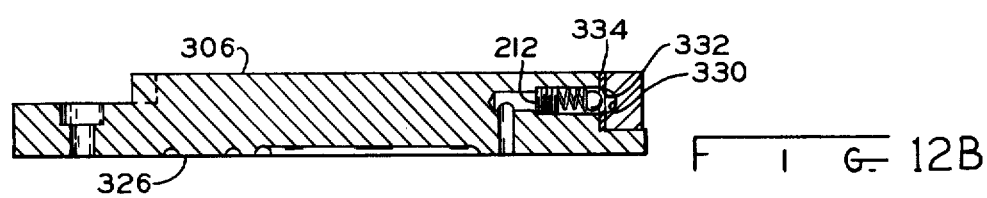
FIG. 12B
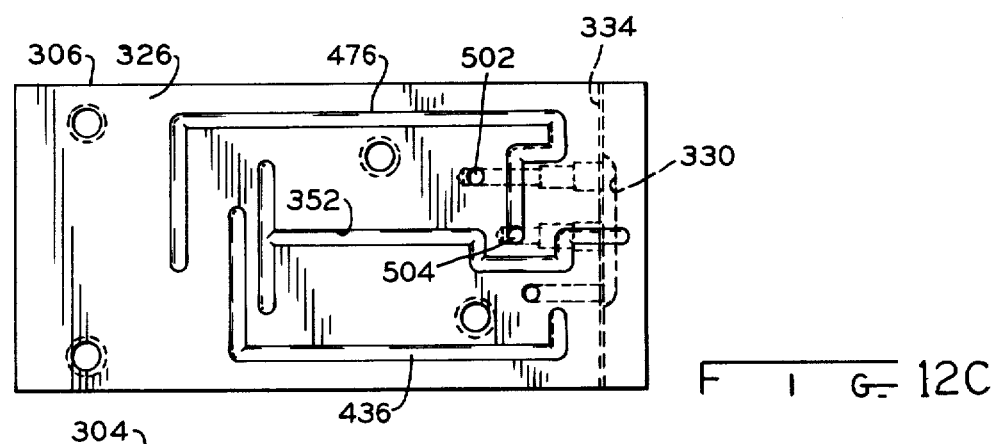
FIG. 12C
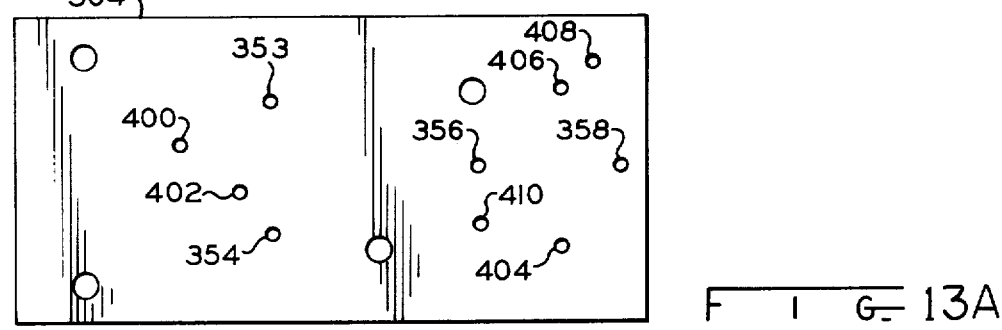
FIG. 13A
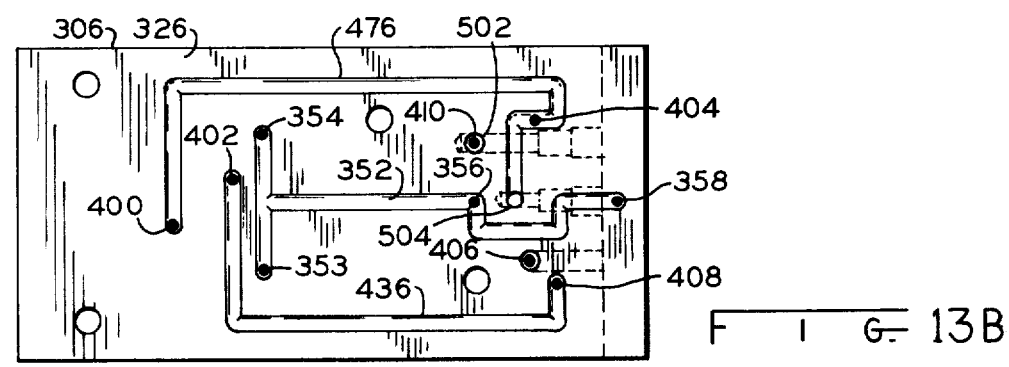
FIG. 13B

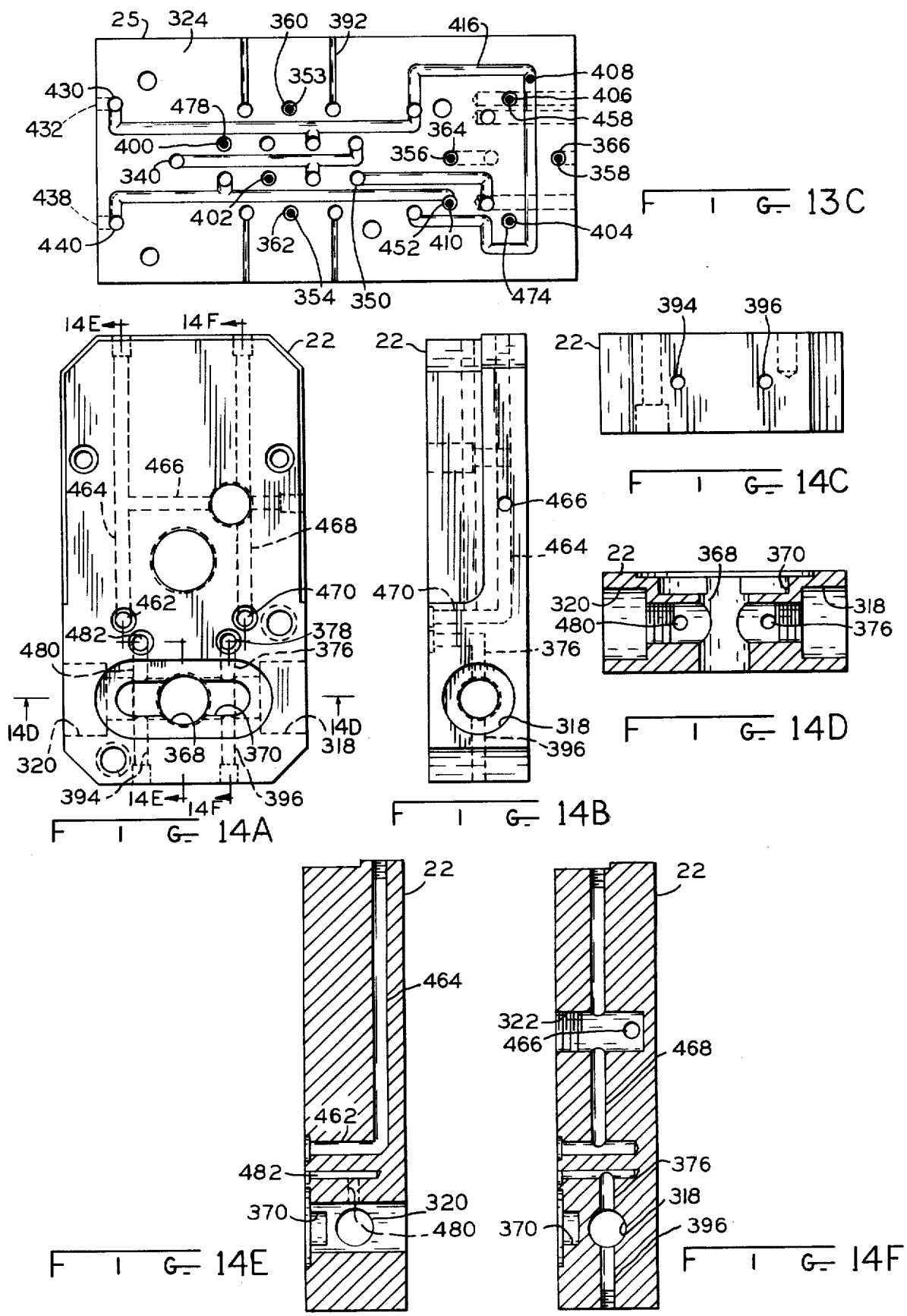

POSITIVE FEED DRILL

BACKGROUND OF THE INVENTION

1. Field of the Invention

This invention is in the field of positive feed drill employing a combination of high torque and high thrust for drilling to precision depths in hard metals, such as titanium.

2. Description of the Prior Art

This invention is an improvement of the positive feed drill disclosed in U.S. Pat. Nos. 4,111,590 and 4,182,588 wherein the pneumatic control system employed pieces and parts external to the drill.

SUMMARY OF THE INVENTION

A housing has supported for rotation and longitudinal travel a spindle of hexagonal cross-section threaded at the apices. A drive gear provided with a hexagonal aperture slidably receives the spindle. A feed gear is threadedly engaged with the spindle and may be rotated at a different speed than the drive gear to longitudinally advance the spindle. The feed gear is capable of being locked against rotation for rapidly retracting the spindle.

A pneumatic circuit comprising a pneumatic pressure source, pneumatically actuated valves, mechanically operated limit valves, adjustable stop members mounted on the spindle and on guide rods provides fully automatic drill operation. Drill advance to a predetermined depth, a drill bit dwell, rapid drill retraction, and drill stop are provided. An essentially complete shut-off of pneumatic energy is provided when the drill is stopped to achieve energy economy.

The drive gear is in mesh with a motor-driven gear. The feed gear is in mesh with a piston gear which has first and second longitudinal positions. In the first position the piston gear is locked to the motor gear by means of a plurality of pins extending from the motor gear and inserted into a corresponding plurality of arcuate slots in the piston gear. In the second position, the piston gear is locked to the housing and against rotation by means of housing pins inserted in the slots. In the first position, the drive gear and feed gear are rotated to impart a predetermined longitudinal advance of the spindle and in the second position the feed gear is locked and the spindle is rapidly retracted to a stop position.

The pneumatic circuit comprising valves, ports and passages is fully contained internally within certain members of the drill frame or housing, thereby resulting in a simplified and more compact overall design which may be economically manufactured in mass production quantities.

It is therefore an object of this invention to provide an improved drill compact in size, light in weight, and having a high torque and thrust output.

A further object is to provide for an improvement in the pneumatic control system for such a drill, by incorporating the system internally within certain drill frame members.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partially sectioned side view of an embodiment of this invention having an internally contained pneumatic control system;

FIG. 2 is an enlarged view of the drive gear of FIG. 1 as it is mounted on the hex-rod spindle, which is shown in cross-section;

FIG. 3 is an enlarged view of the feed gear shown in FIG. 1 as it is mounted on the hex-rod spindle, shown in cross-section;

FIG. 4 is a partial, top plan view of the adjustable rear limit stop;

FIG. 8 is an exploded rear perspective view of the frame assembly within which the pneumatic system is contained;

FIG. 9 is an exploded front perspective view of the frame assembly within which the pneumatic system is contained;

FIGS. 10A through 10E are front, side, rear and sectional views of the front manifold control block, the sectional views being taken along section lines 10D and 10E of FIG. 10A;

FIGS. 11A through 11G are top, bottom, end and sectional views of the central manifold body, the sectional views being taken along section lines 11D, 11E, 11F and 11G of FIG. 11A;

FIGS. 12A through 12D are top, bottom, end and sectional views of the central manifold cover plate assembly, the sectional view being taken along section line 12B of FIG. 12A;

FIG. 13A is a plan view of the sheet gasket which fits between the parts of FIGS. 11A and 12A, FIG. 13B is a view of the ported face of the manifold cover plate but with the ports of the gasket overlaid, and FIG. 13C is a similar view of the manifold block with the gasket ports overlaid; and FIGS. 14A through 14F are front, side, end and sectional views of the rear manifold control block, the sectional views being taken along section lines 14D, 14E and 14F of FIG. 14A.

DESCRIPTION OF THE PREFERRED EMBODIMENTS

Figure 7:
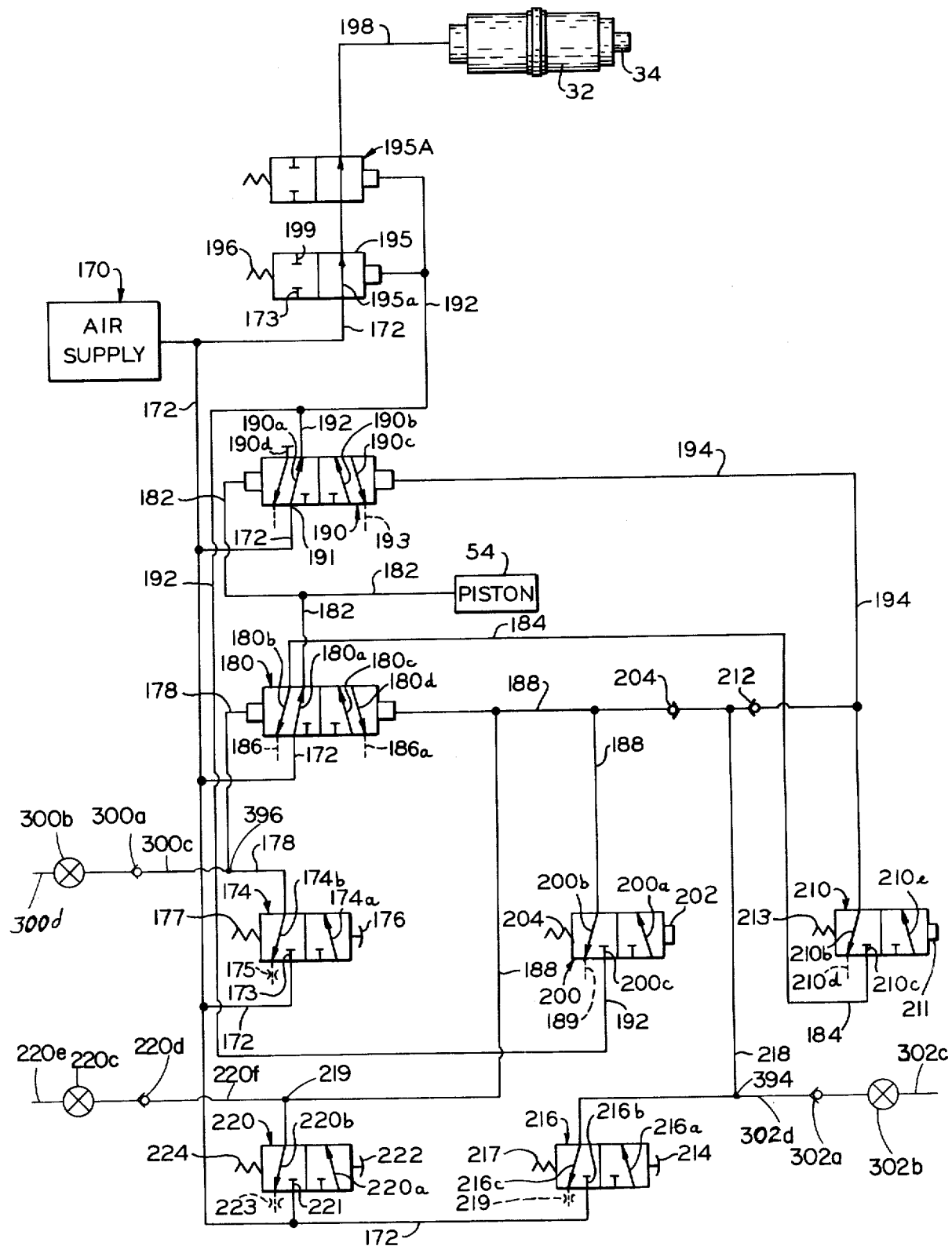
FIG. 7 is a schematic diagram showing the fluid control and drive control elements and valves used in the embodiment of FIG. 1.

Referring to the drawings, housing 20 includes a rear manifold control block 22, central manifold control block assembly 24, and a front manifold control block 26 provided with a gear chamber 28 formed centrally therein. Supported at the underside of housing 20 is an air motor 32 which drives motor shaft 34. A pneumatic silencer 36 is coupled to motor 32 (FIG. 7).

Motor gear 38 (FIG. 5) has central aperture 37 for receiving motor shaft 34 and is driven thereby. Key 40 extends inwardly from a slot in gear 38 into a keyway in shaft 34 to provide a driving connection. Two diametrically spaced pins 42 fixed to gear 38 extend transversely therefrom, gear 38 having teeth 38a. Cap 39 having hub 39a and flange 39b is mounted for rotation centrally of gear 38. Bearing 41a supports hub 39a and thrust bearing 41b supports flange 39b.

Piston gear 44, having teeth 44a, is longitudinally slidable in hub 39a of cap 39 and is rotatably supported in block 26 by bearings 45. Four arcuate slots 48 are formed on centers at 90° intervals adjacent to the outer circumference of gear 44. Two of slots 48 register with pins 42 on gear 38 when gear 44 is in its forward position and register with diametrically opposed pins 50, which are fixed to and extend from block 26, when gear 44 is in its rearward position. Spring 52 acts between cap 39 and adjustable set screw 53a in the bottom of bore 53 in gear 44 to urge gear 44 in a rearward direction wherein pins 50 are engaged in slots 48, locking gear 44 against rotation relative to block 26.

Piston 54 is mounted for longitudinal movement in block 26 and is movable forwardly (leftwardly) by pneumatic pressure to move gear 44 against the force of spring 52, until gear 44 abuts gear 38 and pins 42 become inserted in slots 48. In this position, gear 44 is rotatably locked and driven by gear 38.

Figure 5A:
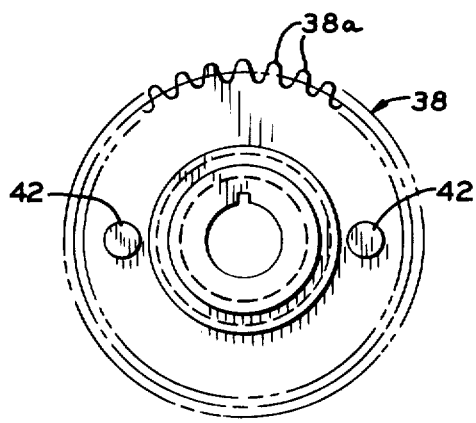
FIG. 5A is an enlarged end view of the motor gear of the embodiment of FIG. 5.
Figure 5B:
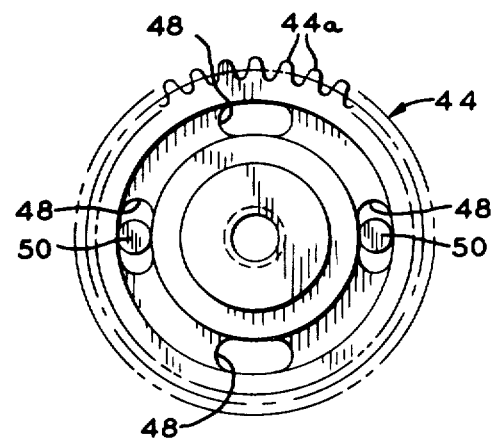
FIG. 5B is an enlarged end view of the piston gear in its rearward position and engaged with the housing pins.
Figure 5:
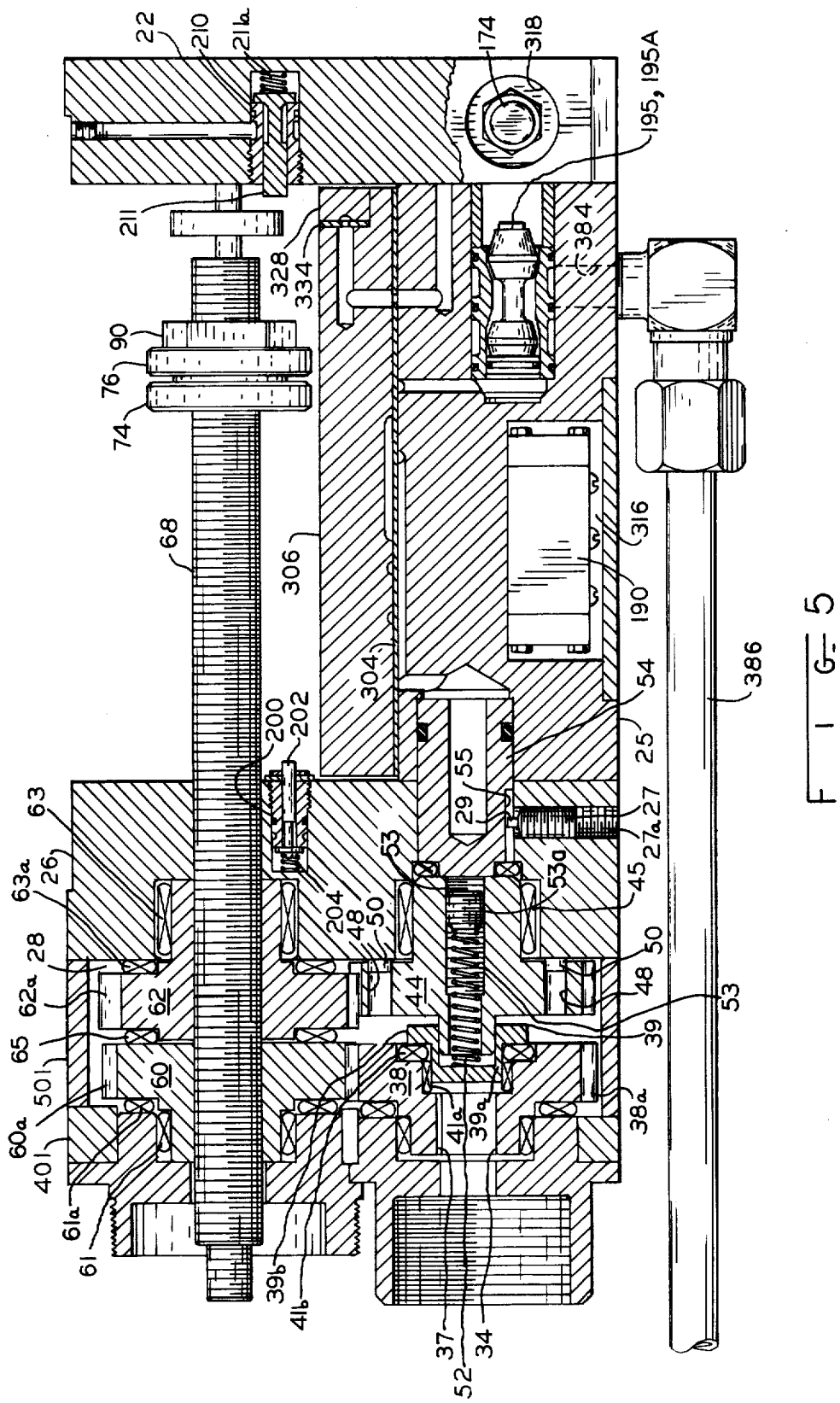
FIG. 5 is an enlarged partially longitudinally sectioned view of the rear portion of the embodiment of FIG. 1.
Figure 6:
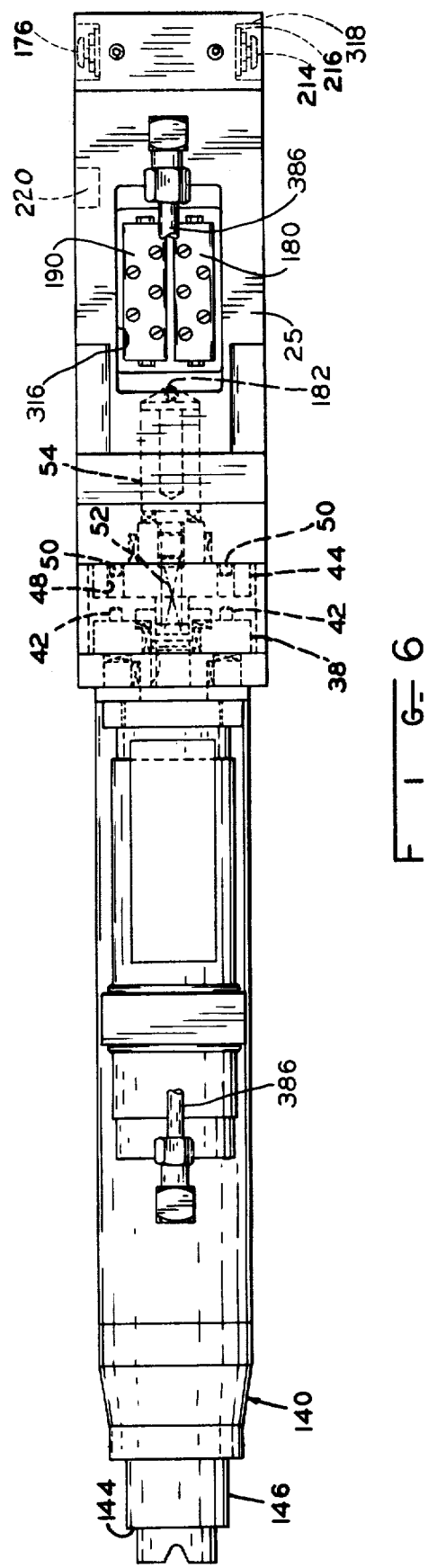
FIG. 6 is a bottom plan view of the embodiment of FIG. 1.

Referring to FIG. 5, a longitudinal keyway 55 is formed in the forward end of piston 54. Set screw 27 is threaded into bore 27a of block 26 and has key 29 protruding from the upper end thereof. Screw 27 is threadedly adjustable in bore 27a until key 29 enters keyway 55. Thus piston 54 is free to move longitudinally in block 26 but key 29 in slot 55 restrains rotational movement thereof. Hence, wear of piston 54 and its seals if the piston were permitted to rotate is greatly reduced.

Drive gear 60 has teeth 60a at its outer circumference. Gear 60 is mounted for rotation in bearing 61 in housing 20. Thrust bearings 61a are also utilized for rotative mounting of gear 60 in gear chamber 28. The teeth 60a of gear 60 are in mesh with the teeth 38a of gear 38.

Feed gear 62 has teeth 62a in mesh with teeth 44a of gear 44. As gear 44 is slidably moved in a longitudinal direction, a relative sliding motion takes place between the meshed teeth 44a and 62a. Gear 62 is mounted for rotation in gear chamber 28 by bearings 63. Thrust bearings 63a are between gear 62 and block 26 and thrust bearings 65 are between gears 60 and 62.

Figure 1A:
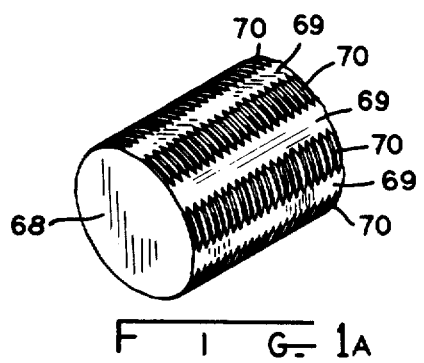
FIG. 1A is a view in perspective of a portion of the hex-rod spindle.
Figure 1B:
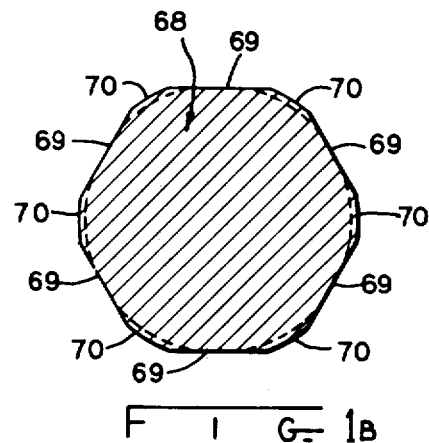
FIG. 1B is an end view of a hex-rod spindle.

Gear 60 has a flat sided hexagonal aperture 64 (FIG. 2) while gear 62 has a threaded circular aperture 66 (FIG. 3) centrally thereof. Received in both apertures 64 and 66 is hex-rod spindle 68 (FIGS. 1A and 1B) having flat sides 69 which are slidably received by aperture 64 and six threaded apices 70 at the corners thereof which are threadedly received by threaded aperture 66. Thus it is seen that when gears 60 and 62 are rotated, spindle 68 will be moved longitudinally according to the pitch of the threads on spindle 68 and speed of rotation. Gear 60 applies the rotative force due to the contact between the flat sides of hexagonal aperture 64 and flats 69 on spindle 68. Due to this relatively large surface contact, very high torque can be applied to spindle 68.

Since gear 62 is mounted for rotative motion only in gear chamber 28 and not for longitudinal movement, spindle 68 thus has imparted thereto a longitudinal movement in housing 20. As will become apparent later, when piston gear 44 is in its forward position and pins 42 are engaged in slots 48, gear 44 will be rotated at the same rotative speed as motor shaft 34, and spindle 68 will have a forward longitudinal movement imparted thereto. This speed of rotation and longitudinal advance can, of course, be varied by varying the gear parameters.

However, when gear 44 is in its rearward position and pins 50 are engaged in slots 48 so that gear 44 is locked against rotation, then gear 62 will also be locked against rotation and the large speed differential between gears 60 and 62 will retract hex-rod spindle 68 at a relatively high rate of speed.

Depth nut 74 (FIGS. 1 and 5) is in threaded engagement with threaded apices 70 of spindle 68 and adjustable longitudinally thereof. Lock nut 76 is also in threaded engagement with the apices 70 of spindle 68 and is tightened against nut 74 to prevent relative motion of nut 74 to spindle 68 once it has been adjusted longitudinally thereof to select the depth of drill, as will be later explained.

A pair of parallel, elongated guide rods 80 and 82 are supported in housing 20, and are spring mounted at 84, 86, respectively, in rear control block 22 (FIG. 4). Fixed stop member 78 has transversely spaced apertures which receive rods 80 and 82. Set screws 78a and 78b are tightened upon rods 80 and 82, respectively, to hold member 78 thereto. Adjustable rear stop member 90 has guide apertures 92 and 94 for slidably receiving rods 80 and 82, respectively. Set screws 92a and 94a are threadedly engaged with member 90 and are tightened upon rods 80 and 82, respectively, to hold member 90 in a given longitudinal position relative to rods 80 and 82. As will become apparent, the relative longitudinal position of member 90 on rods 80, 82 determines the rearward travel limit of spindle 68. Nut 76 is registrable with member 90 to impart a rearward travel to rods 80 and 82 against springs 84 and 86, respectively, causing stop member 78 to actuate rear limit valve 210 (FIG. 5), as later explained. In the event member 90 has not been set, or set improperly, the rearward travel of spindle 68 will be halted by the rearward end of spindle 68 engaging member 78 to actuate valve 210.

By adjusting depth nut 74 on spindle 68 and properly positioning member 90, the forward and rearward limits of travel of spindle 68 are set.

Elongated drive adapter 100 (FIG. 1) has threaded socket 102 which is threadedly engaged with end 104 of spindle 68. The pitch of the threads are in a direction so that during the drilling operation, the threaded engagement between end 104 and socket 102 is tightened. Drive pins 106 extend transversely from adapter 100 and are spaced longitudinally therealong.

Elongated drive rod 108 has socket 110 which receives the foward end of adapter 100. Longitudinally spaced dwell slots 112 are in the walls of socket 110 and receive pins 106. High compression spring 114, such as a Belleville spring washer, is mounted between flange 109 on socket 102 and shoulder 105 on adapter 100 to urge rod 108 in a forward direction. During drilling spring 114 is of sufficient strength to maintain pins 106 in contact with the rearward ends of slots 112.

The forward end of rod 108 has threaded socket 116 for receiving threaded stub 118 of a tool bit 120. Typically, bit 120 is a hardened metal drill suitable for use in very high pressure, high torque drill applications. Rod 108 is threaded on its outer surface and threadedly receives dwell nut 122 which is adjustable longitudinally of rod 108. Nut 122 has annular flange 124 at its forward end. Lock nut 126 is threadedly mounted on rod 108 and tightened against nut 122 to lock it in position on rod 108.

Thrust bearing 128 has ball bearings 130 caged between bearing sections 132 and 134 which are fitted on flange 124 so that section 132 has a low friction, rotatable mounting relative to section 134.

Annular nose piece assembly 140 is mounted at the forward end of tubular assembly 30 and has annular shoulder stop member 142 formed rearwardly thereof and annular rim 144 at the forward end thereof. Slidably mounted in assembly 140 is sleeve assembly 146 having an outer sleeve 148 and inner sleeve 150 supported concentrically so as to define an annular coolant flow space 152 therebetween. Mounted at the rearward end of assembly 146 is coolant adapter ring 154 which is made of a hardened metallic material in which is formed a radial passage 156 communicating with annular space 152. A source of pressurized coolant liquid (not shown) is attached to passage 156 and coolant is then admitted under pressure to space 152 and sprayed from annular nozzle 158 at the forward end of assembly 146, as at 159. Thus, a ring of coolant spray is focused on the drill and the workpiece.

Assembly 146 is forwardly urged by compression spring 159 which acts against circular clip 160 mounted in fixed relation to housing assembly 30. Contact between the workpiece surface and end 162 of outer sleeve 148 causes rearward retracting movement of sleeve 146 within nose assembly 140. When drill bit 120 is advanced to the workpiece, thrust bearing 128 will contact ring 154 and thus advance sleeve 148, maintaining skin contact and coolant spray at the drilling area. Longitudinal slot 164 in the lower portion of housing 30 permits longitudinal movement of passage 156 relative to housing assembly 30 as sleeve assembly 146 is longitudinally moved.

FIG. 7 is a schematic showing of a number of fluid valves each of which have different valve positions. These positions are obtained by manual actuation, fluid pressure, or physical contact with limit stops on the drill spindle. These valves, and the passages therebetween, are mounted to obtain their different positions and have connecting passages as shown in FIGS. 8 through 14 in rear control block 22, center control block 24 assembly, and forward control block 26. In the drawings, and in particular FIGS. 1, 5, 6 and 8 through 14, the valves and connecting passages are shown in detail. Of importance is the fact that this pneumatic system is fully contained internally within the frame assembly 22, 24, 26.

A source of air under pressure is shown schematically at 170 and provides line 172 with supply pressure. Start valve 174, which has a manually operated button 176, is mounted transversely in block 22 and has its valve spool urged by spring 177 to the rightward position shown in FIG. 7, wherein line 172 is blocked at stop 173. When the spool of valve 174 is moved leftwardly by manual pressure on button 176, fluid connection is made between supply line 172 and first line 178 through valve passage 174a. Control valve 180, mounted in block 25 (FIGS. 11A–11G), is actuated rightwardly in response to supply pressure in line 178 to the position shown in FIG. 7 to connect line 172 to second line 182 through valve passage 180a and to connect third line 184 to exhaust 186 through valve passage 180b. Piston 54, as previously described, is mounted in block 25 for reciprocal movement and is urged by spring 52 acting against gear 44 rearwardly of the drill. Upon the presence of supply pressure in line 182, piston 54 is moved forwardly to cause spindle 68 to advance as previously described. Supply pressure in fourth line 188 moves the spool of valve 180 in a leftward direction, as shown in FIG. 7, to disconnect line 172 from line 182 and also to connect line 172 with line 184 through valve passage 180c and at the same time connect line 182 to exhaust 186a through passage 180d.

Control valve 190 mounted in block 25 has its spool urged to its rightward position (as shown in FIG. 7) upon supply pressure being present in line 182 and in this rightward position connects line 172 at port 191 to fifth line 192 through valve passage 190a. Valve 190 has its spool moved leftwardly upon removal of supply pressure from line 182 and presence of supply pressure in sixth line 194. In such leftward position, the supply pressure in line 172 and valve passage 190b is blocked by stop 190d and line 192 is exhausted at exhaust 193 through valve passage 190c.

Motor supply valves 195 and 195a mounted in side block 25 have the spools thereof urged rightwardly by corresponding springs 196 and moved leftwardly against this spring pressure by the presence of supply pressure in line 192, and as shown in its leftward position in FIG. 7. In this position, line 172 is connected to seventh line 198 through valve passage 195a to actuate motor 32. In the rightward position of valves 195, 195a, line 172 is blocked at stop 173 and line 198 is blocked at stop 199.

As previously described, depth nut 74 is adjustable on spindle 68 and is carried forward with the spindle in the drilling operation. The forward travel limit of spindle 68 is determined when nut 74 moves the spool of depth valve 200, by engaging its end 202 leftwardly against spring 203, until the supply pressure in line 192 is connected to line 188 through valve passage 200b, moving the spool of valve 180 leftwardly against the pressure exerted by the fluid in line 178 and valve passage 174b being connected through restriction 175 in valve 174 to permit a controlled leftward movement to the spool of valve 180. The leftward position of the spool of valve 180 connects line 184 to supply pressure in line 172 through valve passage 180c and connected line 182 to exhaust 180a through passage 180c. Check valve 204 prevents flow from line 188. In the rightward position of valve 200, line 188 is connected through valve passage 200b to exhaust 189 and line 192 is blocked at stop 200c.

Removal of supply pressure from line 182 causes piston 54 to move rearwardly under the force of spring 52 which results in a rapid retraction in a rearward direction of spindle 68 as previously described. The retraction in a rearward direction of spindle 68 continues until adjustable stop 90 is contacted by lock nut 76 causing stop member 78 to engage end 211 of the spool of valve 210 moving it leftwardly (FIG. 7) or rearwardly (FIG. 1) against spring 213. In the leftward position, line 194 is disconnected from passage 210b and exhaust 210d and is connected to the supply pressure that is now in line 184 through valve passage 210e to move the spool of valve 190 leftwardly thus removing supply pressure from line 192. Line 184 in the rightward position of valve 210 is blocked at stop 210c. The removal of supply pressure from line 192 causes the spool of valve 195 to move rightwardly under the force of spring 196 to disconnect supply pressure from line 198 and turn off motor 32. Check valve 212 prevents flow from line 194. At this point, the motor is off and all supply pressure outlets are blocked thus conserving energy.

The cycle may be stopped at any time by manually depressing button 214 of stop valve 216 moving its spool leftwardly (FIG. 7) and connecting an eighth line 218 to supply pressure in line 172 through passage 216a. Lines 188 and 194 are thus connected, through check valves 204 and 212, respectively, to supply pressure, moving the spools of valves 180 and 190 leftwardly to stop motor 32 as previously described. In the rightward position of valve 216, line 172 is blocked at stop 216b and line 218 is connected to restricted exhaust 219 through passage 216c. Remote depth valve 220 may be provided to be manually actuated to reverse the forward travel of spindle 68. Leftward movement of the spool of valve 220 by manual actuation of button 222 against spring 224 will serve to connect supply pressure from line 172 to line 188 through valve passage 220a thus actuating piston 54 to reverse spindle 68 as previously described. In the rightward position of valve 220, line 172 is blocked at stop 221 and line 188 is connected to restricted exhaust 223 through passage 220b. With the fluid circuitry of this invention, supply pressure is blocked when not in use to minimize energy waste.

An additional depth control valve may be located in the circuit as indicated by the numeral 220c. Its operation is the same as depth control valve 220 except it receives its air supply from an external source, not shown.

Except for the differences as shown by comparison, the spindle and drive portions of the apparatus disclosed thus far herein are essentially the same as that disclosed in prior U.S. Pat. Nos. 4,111,590 and 4,182,588.

As one feature of improvement, "start" and "stop" operation may be effected remotely by the addition of remote control devices 300 and 302, respectively. For remote "start", a check valve 300a and another remotely located valve 300b like valve 174 are series connected in a line 300c connected to the port of valve 174 which admits air supply to line 178 upon actuation of valve 300b. Like connections may be made from line 300c between check valve 300a and valve 300b via an additional check valve 300d to "start" valve 174 of an additional drill apparatus whereby operation of a single "start" valve 300b will result in simultaneous operation of the two drill apparatuses. By this means, a plurality of drill apparatuses may be ganged and set into operation simultaneously.

Correspondingly, the apparatuses may be stopped by means of a remotely located "stop" valve 302b connected to "stop" valve 216 in the same manner as just explained for remote start device 300, the same pieces and parts being indicated by the numeral 302 but with the same suffix letters added. A gang of drill apparatuses may thus be remotely controlled to operate in unison.

OPERATION

In operation of this positive feed drill which is essentially the same as for the drill in the aforesaid U.S. Letters Patents, before the drill is actuated, depth nut 74 is adjusted on spindle 68 to set the forward travel limit of spindle 68. Lock nut 76 is tightened against nut 74. Stop member 90 is then adjusted on guide rods 80 and 82 to set the rear travel limit of spindle 68 and determine that point at which the cycle is completed and the motor 32 is turned off. When depth nut 74 is adjusted, dwell nut 122 and lock nut 126 are correspondingly adjusted on drive rod 108.

To initiate operation, button 176 on start valve 174 is depressed which introduces supply pressure into line 178 moving the spool of valve 180 to the left (FIG. 7) supplying pressure to piston 54 which then moves gear 44 forwardly with respect to the drill against spring 52 until slots 48 in gear 44 engage pins 42 establishing a driving connection therebetween. Further, supply pressure is applied to valve 190 moving its spool rightwardly (FIG. 7) supplying pressure to valves 195, 195a to move the spools leftwardly against air pressure in line 172 to actuate motor 32 imparting rotational motion to shaft 34. Shaft 34 through key 40 drives motor gear 38 which in turn drives piston gear 44 through pins 42 and slots 48. Gear 38 is in mesh with drive gear 60 rotating it at a predetermined speed and gear 44 is in mesh with feed gear 62 rotating it at a speed higher than that of gear 60. Gear 60 provides a high torque drive to hex-rod spindle 68. Feed gear 62 is in threaded relation with the threaded apices 70 of spindle 68 causing it to longitudinally advance at a predetermined rate, which is possible due to the longitudinal sliding contact between the flats of aperture 64 and the corresponding flats on spindle 68.

Spindle 68 advances drill bit 120 toward the workpiece. Drilling takes place after bit 120 contacts the workpiece and continues until depth nut 74 contacts the spool of valve 200 moving it leftwardly against spring 204, causing supply pressure to move the spool of valve 180 leftwardly thus disconnecting supply pressure to line 182 so that gear 44 and piston 54 move rearwardly under the force of spring 52 to disengage pin 42 from slots 48 and cause engagement between pins 50 and slots 48 thus locking gear 44 in a stationary position. This also locks gear 62 from rotation and since gear 60 is continuing to rotate, and at a much faster rate than gear 62, spindle 68 is caused to rapidly retract in a rearward direction under a positive drive force. This retraction continues until lock nut 76 contacts stop 90 which moves guide bars 80 and 82, and thus stop 78 rearwardly against the spool of rear limit valve 210. Valve 210 has its spool moved against spring 213 thus supplying line 194 with supply pressure to move the spool of valve 190 leftwardly, removing supply pressure from line 192 whereby the spools of valves 195, 195a will move rightwardly under the force of air pressure in line 172 to cut off motor 32. The drill is now in "off" position and pneumatic supply lines have been blocked, thereby conserving energy.

A manual stop is provided and may be actuated by depressing button 214 (or the same button of valve 302b) moving the spool of valve 216 leftwardly against air pressure in line 172, placing supply pressure in line 218 to check valves 204 and 212 to respectively supply pressure to lines 188 and 194 which moves the spools of valves 180 and 190 leftwardly and piston 54 rightwardly, disengaging gear 44 and stopping motor 32. Spindle 68 also may be reversed, at any point in its forward travel, by depressing button 222 (or the same button of valve 220b) manually to move the spool of valve 220 leftwardly against spring 224 and to supply pressure to line 188 thus to move the spool of valve 180 leftwardly. Before reversal of spindle 68 and after surface 132 contacts surface 148 on coolant gland 154, pins 106 move in slots 112, compressing spring 114. The forward travel of drill bit 120 is maintained at the drill depth while pins 106 are moving in lost motion slots 112. Stop nut 74 is adjusted as to contact 202 before pins 106 run out of travel in slot 112 as to provide a given amount of deburing and polishing. After pins 106 have completed their travel in slots 112, drill bit 120 will be retracted with spindle 68.

PNEUMATIC CIRCUIT ASSEMBLY

As shown in FIGS. 8 and 9 and additionally in detail in the following figures, the pneumatic circuitry of FIG. 7 is embodied internally within the frame assembly more generally indicated by the numerals 22, 24, 26. The central control block assembly, otherwise indicated by the numeral 24, is composed essentially of three different structural parts, the manifold body 25, a gasket 304 and a manifold cover plate 306, these parts being tightly superposed and secured together by means of four suitable threaded fasteners near the corners thereof. These manifold parts 25, 304, 306 have drilled passages, milled grooves which serve as passages, and valves mounted internally thereof as shown, these being interconnected with similar valves, passages and components in the other control blocks 22 and 26 as shown. Simply stated, the circuitry of FIG. 7 is embodied internally of these control blocks as contrasted with the prior art devices of U.S. Pat. Nos. 4,111,590 and 4,182,588 wherein much of the circuitry was external to these blocks.

Referring more specifically to the central and manifold block assembly 24, and with more specific reference to the series of FIGS. 11A through 11G, the two motor supply valves 195 and 195a are mounted within suitable cylindrical bores 308 and 310 within the manifold body 25, these bores having open ends as shown in FIG. 11C adapted to be covered by the flat mating surface of rear manifold block 22.

The manual depth valve 220 is also mounted within the manifold body 25 within a laterally extending recess 312 but with its pushbutton exposed for manual access. The depth valve 220c is not contained within the apparatus but is located elsewhere for manual remote control of the depth function. The piston 54 fits into cylinder bore 314 in the opposite end of the body 25 from the valve-receiving ports 308 and 310. A rectangular cavity 316 is provided in the outer surface portion of the body 25 as shown and receives therein in fully recessed relation the two control valves 180 and 190. All of these valves and the piston 54 have certain passages and ports formed internally of the body 25 leading thereto, these being clearly shown in FIGS. 8 and 9 and in particular the series of FIGS. 11A through 11G. All of these passages and ports conform to the schematic shown in FIG. 7.

The front manifold control block has the depth valve 200 mounted therein within the cylindrical bore 316 and further includes ports and passages internally thereof which connect to corresponding passages in the front end of manifold block 25 according to the schematic of FIG. 7. The hole 68a receives the spindle 68, and the hole 44a, having a stepped diameter, the gear 44 and piston 54.

The rear manifold block 22 contains the "start" and "stop" push button control valves in the sides thereof within stepped diameter bores 318 and 320, respectively, as more clearly shown in FIGS. 14A and 14D. The reverse limit valve 210 is received within a bore 322 which opens through the front surface of block 22 as shown more clearly in FIG. 14F. Connecting passages and ports are provided within this block 22 for these valves as well as for the valves, ports and passages within the manifold body 25, the front surface of the block 22 abutting the rear end of the manifold body 25 (righthand end as viewed in FIG. 11C) to provide the necessary connections between passages and valves in accordance with the schematic of FIG. 7.

The remaining components, passages and ports of schematic FIG. 7 are provided in the manifold cover plate 306 and gasket 304 (FIGS. 8, 9, 12A through 12C and FIG. 13), the components being primarily in the form of the two one-way check valves 204 and 212 internally of plate 306. The passages and ports therein register with certain of the apertures in the gasket 304 and the exposed groove passages and ports in the upper surface 324 of the manifold block 25. As is clearly shown in the drawings, the surface 324 is flat as is the surface 326 on the cover plate 306, these surfaces otherwise being congruent so as to clamp the sealing and porting gasket 304 securely therebetween, suitable threaded fasteners being used for the purpose. Threaded fasteners and dowel pins are also used for securing together the control blocks 22, 25 and 26 to assure proper alignment and registry of the various ports and passages therein, these threaded fasteners being removable for easy disassembly and assembly of the blocks.

A small elongated end plate or block 328 (FIGS. 8, 9, 12A and 12B) is secured to the rear end (righthand end as viewed in FIGS. 12A and 12B) of the cover plate 306 to overlie three end ports therein, two of these leading to the check valves 204 and 212. This end plate 328 is provided with an elongated groove 330 in the surface thereof which matches holes 331, 333, 335 in a gasket 334 which is sandwiched between the end plate 328 and the end of the cover plate 306 as shown to provide fluid coupling between the three end ports.

The central manifold control block assembly 24 composed of the manifold body 25, the cover plate 306 and the gasket 304 is provided with the a unique arrangement of grooves, passages and ports as well as valve-locating cavities which enable the internal containment of much of the circuitry of FIG. 7. As shown in FIGS. 8 and 9 taken with the FIGS. 11 and 12 series and FIG. 13 show that the two surfaces 324 of body 25 and 326 of plate 306 have a series of milled grooves therein which are intercepted by a series of ports at the ends of internal, bored passages. Typical of such grooves is groove number 336 in body 25 (FIGS. 8, 11A, 11D and 11E) which intercepts three ports 340, 342 and 344 (FIGS. 8, 11A and 11D) which connect to three different straight bores extending parallel to each other, such as bores 346 and 348 connected to ports 340 and 344, respectively (FIG. 11D), the bore 346 leading to the rear end of piston chamber 314 and the bore 348 leading to the valve-receiving cavity 316 as shown. The bore (not shown) connected to the port 342 (FIGS. 8 and 11A) also leads to the valve-receiving cavity 316 in the same manner as bore 348, these being parallel as further shown by the four bores in FIG. 11E. The opposite ends of these bores like bore 348 and those shown in FIG. 11E terminate in a pattern of ports within recess 316 as clearly shown in FIG. 11C which are of standard size and spacing to register with the corresponding ports in the two conventional valves 180 and 190, port 350, for example, being on the opposite end of bore 348 from port 344 (FIGS. 11C and 11D). This port 350 is one of the seven ports denoted by the numeral 190' which are registered with the ports of the valve 190, the port 350 corresponding to the pilot of the valve 190 connected to the line 182 (FIG. 7) from which a passage is traced through bore 348, groove 336, port 340, passage 346 and into the piston bore 314. In order to further define and to close the open side of the groove 336, the gasket 304 serves as a cover or closure thereover. By the same token, the gasket 304 serves as a closure for other of the grooves in surfaces 324 and 326 of the two manifold parts 25 and 306 to convert them into passages. Also, the gasket 304 has certain apertures therein which provide communication between certain ports and grooves within the two surface 324 and 326 according to the circuit arrangement of the schematic of FIG. 7. Typical of this is represented by the groove 352 in surface, 326 (FIGS. 9 and 12C) which register with the four apertures 353, 354, 356 and 358 in gasket 304 to provide a fluid connection with ports 360, 362, 364 and 366, respectively, in the surface 324 of manifold body 25.

Suffice it to say, from a functional standpoint, the passage 352 in surface 326 (FIG. 12C) is continuously charged with air from the air supply 170. This air is ported from the groove 352 through the gasket 304 into the ports and passages in the body 25 leading to the various valves which are shown in the schematic as having a permanent connection to the air supply line leading to the air supply 170.

This air supply is fed to the groove 352 from a fitting (not shown) threaded into the main air supply inlet opening 368 (FIGS. 14A, 14D and 14E) in the rear manifold block 22. This bore 368 passes completely through the block 22 and on the left end as viewed in FIG. 14E centrally intersects an elongated slot 370 in the front or lefthand face of the block 22. A milled groove 372 surrounds the slot 370 and is adapted to receive an elongated slotted gasket 374 (FIG. 9).

Extending laterally oppositely from the air inlet 368 are the two bores 318 and 320 (of block 25) which, as explained previously, receive the two "start" and "stop" valves 174 and 216, respectively. Connected to the output side of the valve 174 is a passage 376 (FIGS. 14D and 14F) corresponding to line 178 in the schematic of FIG. 7 which leads to a port 378 in the front surface of the block 22 this in turn registering with the port and passage 380 (FIGS. 8, 11A, 11B and 11D) in the contiguous end face of the manifold body 25. Thus, upon actuating the start valve 174, air under pressure is admitted to these passages and ports 376, 378 and 380 to the groove 382 in body surface 324 and the port connected thereto.

Referring back to the air inlet port 368 and its elongated slot 370, this slot at the ends thereof coincide with the bores 308 and 310 (FIGS. 11C, 11D, 11F and 11G) thereby providing an air supply to the input side of the two valves 195 and 195a. These same bores 308 and 310 are further ported transversely through the body 25 by means of an air outlet passage 384 (FIGS. 9, 11C and 11D). Thus, when the valves 195 and 195a are piloted "on", air is admitted to the outlet port 384 directly from the inlet port 368 (FIG. 14 series) for operating the motor 32. An external pipe or line 386 leads from the port 384 to the motor 32, this line 386 overlying and extending parallel to the surface 388 (FIGS. 5 and 9) of the manifold body 25, this being the only part of the schematic of FIG. 7 external to the drill apparatus. Recapitulating, when the two valves 195 and 195a are actuated in accordance with the sequence of operations of the components as shown in the schematic of FIG. 7, air under pressure is applied to the motor 32 directly from the air inlet port 368 in the rear manifold block 22.

Another air supply port 390 in the end of the manifold body 25 (FIGS. 11A and 11B) registers with the central portion of the air inlet bore 368 of block 22 (FIG. 14 series). Thus, air is applied continuously to the port 390, its passage in manifold body 25 where it exits through the surface 324 from port 366 (FIGS. 8 and 11A). The port 368 registers with the aperture 358 and gasket 304 which in turn coincides with the end of groove 352 in the manifold plate 306 (FIG. 9). Thus, the groove 352 is continuously charged with air under pressure from the air inlet 368.

A further important feature in the pneumatic circuit is the simple expedient of providing venting or exhaust passages for the various valves, this being simply accomplished by means of venting grooves 392 provided on the surface 324 of the body 25 (FIGS. 8, 11A and 11E). It will be noted that these venting passages 392 lead to ports in the central portion of the body surface 324 which in turn are connected to passages leading to the ports 180' and 190' (FIGS. 11C and 11E) for the valves 180 and 190 (FIG. 7). The gasket 304 serves as a closure for the vent passages 392.

Referring again to the FIG. 14 series which show the rear manifold block 22, and more particularly to FIGS. 14A, 14C and 14F, two passages 394 and 396 are provided in the block in spaced apart relation which communicate with the slot 370 in registry with the output sides of the two "start" and "stop" valves, respectively, 174 and 216. To these two passages 394 and 396 may be connected the remote control "start" and "stop" accessories 300 and 302 (FIG. 7). When these remote accessories are not being used, the passages 394 and 396 are plugged. Suffice it to say, the passages 394 and 396 are so located with respect to the air slots 370 and the output sides of the two "start" and "stop" valves 174 and 216 that air under pressure admitted to either of these ports would be directly communicated to the output sides of the valve into the circuit connected to said output sides. Thus, it would not be necessary to operate the "start" and "stop" valve on the drill apparatus itself in order to control operation, such control being accomplished by means of the remote valve accessories 300 and 302.

For the purpose of identifying and relating the various ports, passages and components of the FIG. 7 schematic with those in the physical counterparts in the various manifold blocks, additional reference numerals are applied to both the schematic of FIG. 7 and FIGS. 8 through 14 of the drawings. The various valves are purchased items and those utilized in a preferred working embodiment of this invention are listed in the following, it being understood that these are being given by way of example only and not as limitations as to the scope of coverage.

|  | Type and Manufacturer |
|---|---|
| Start valve 174 | #203773 Desoutter |
| Piston control valve 180 | KV9-5 Kay Pneumatics |
| Motor control valve 190 | KV9-5 Kay Pneumatics |
| Motor supply valves 195 and 195A | Y250IN Humphrey Products |
| Remotely operated depth valve 220 | MAV-2C Clippard |
| Single operated depth valve 200 | #172003 Desoutter |
| Reverse limit valve 210 | #172003 Desoutter |
| Stop valve 216 | #203763 Desoutter |
| Check valves 204, 212 | MCV-1 Clippard (Modify to round |

-continued

| Type and Manufacturer |
| --- |
| from stock hex) |

In the following are charted the various components, ports and passages in the manifold assembly 22, 24, 26 in conforming relation to the equivalent symbols in the FIG. 7 schematic, the numerals applied to FIGS. 8 through 14 being listed in sequence corresponding to the direction of air flow from point to point in the schematic. "O"-ring seals, not shown, are used to seal the port-to-port connections between the ends of body 25 and the front and rear blocks, respectively.

1. Air supply 170 to "Start" valve 174.

Air passes from supply 170 through port 368 into pressure area of cavity 318 (for start valve 174).

2. Start valve 174 to pilot of valve 180 (line 178).

Through internal passage 174A of start valve 174, passage 376, passage 378, an "O" ring seal, passage 380, passage 381, groove 382, passage 350, an "O" ring seal into left pilot port of valve 180.

3. Air supply 170 to piston control valve 180.

From passage 370 air flows through passage 390 and passage 366, gasket hole 358, groove 352, gasket hole 354, passage 362, an "O" ring seal to pressure port of piston control valve 180.

10. Line 192 from motor control valve 190 to depth control valve 200.

Air travels from internal air passage 190A of valve 190, through an "O" ring seal, through passage 414 to groove 416, through passage 430, through passage 432, through an "O" ring seal, through passage 424, through passage 426, through passage 428 into pressure area of cavity 316 (for depth control valve 200).

11. Line 188 from depth control valve 200 to pilot of piston control valve 180.

Air travels from outlet area of cavity 316 (for depth control valve 200), through passage 434, passage 436, an "O" ring seal, passage 438, passage 440, groove 442, passage 444, an "O" ring seal into right pilot port of valve 180.

12. From remote control depth valve 200c to line 188.

Air travels from outlet area of cavity 450 through passage 452 to groove 442.

13. Line 184 from piston control valve 180 to reverse limit valve 210.

Air travels through internal air passage 180B, passage 484 (FIG. 11), gasket hole 402, groove 436, gasket hole 408, hole 458, hole 460, an "O" ring seal, hole 462, passage 464, passage 466 to the pressure side of cavity 322.

14. Line 194 from reverse limit valve 210 to pilot of motor control valve 190.

Air travels from outlet area of cavity 322 through passage 468, passage 470, an "O" ring seal, passage 472, passage 474, gasket hole 404, groove 476, gasket hole 400, passage 478, an "O" ring seal into right pilot port of motor control valve 190.

15. Line 172 from air supply to manual stop valve 216.

Air travels from supply 170 through bore 368, bore 368 into pressure area of cavity 320 (for manual stop valve 216).

16. Line 218 from manual stop valve 216 to check valves 204 and 212.

Through internal passage 216A of manual stop valve 216 through passage 394, passage 482, an "O" ring seal, passage 484, passage 486, gasket hole 406, passage 488, passage 490, gasket hole 335, groove 330, gasket hole 333, and gasket hole 331 to check valves 204 and 212.

17. From check valve 204 to pilot of piston control valve 180.

Air travels from outlet end of check valve 204 through passage 500, passage 502, gasket hole 410, groove 442, passage 444, an "O" ring seal into right pilot port of valve 180.

18. From check valve 212 to line 194.

Air travels from outlet end of check valve 212, passage 498, passage 504 into groove 476 (equivalent of line 194).

19. Alternate remote control depth access 220c. (Air pulse into this port will equal depth return signal.)

Air travels in through passage 506 to passage 444.

The remote start signal is provided from an external source of air pressure (not shown) by line 300d, manually-actuated palm button valve 300b, external check valve 300a, and line 300c (FIG. 7) coupled to line 178 at passage 396 (FIGS. 14B, 14C, 14F) by removing the plug (not shown) therefrom. The remote start signal is provided from the external source of air pressure by line 302c, manually-actuated palm valve 302b, external check valve 302a and line 302d (FIG. 7) coupled to line 218 at passage 394 (FIGS. 14B, 14C, 14F) by removing the plug (not shown) therefrom. The remote retraction signal is provided from the external source of air pressure by line 220e, manually-actuated palm button valve 220c, external check valve 220d and line 200f (FIG. 7) coupled to line 188 at plug 219 (FIG. 1).

With all the circuit components, ports and passages thus incorporated internally within the frame assembly 22, 24, 26, it will be understood that machining and assembly on a mass production basis is facilitated and rendered essentially foolproof. Furthermore, since all the circuitry is internally contained, the pneumatic system becomes more durable and less subject to damage. The blocks of the frame assembly still retain the purpose of providing primary apparatus support, but the space occupied thereby is fully utilized in containing the pneumatic circuitry. This results in the apparatus being more compact and lighter in weight than its predecessor. The "start" and "stop" valves 174 and 216 as well as the remote depth control valves 220, 222 are fully recessed within the frame assembly with only the push button plungers thereof being partly exposed for manual access. The remaining valves are also recessed, especially the motor supply valves which are contained within the manifold body 25 and there held in place by reason of the rear block 22 being secured to the end of the block 25.

The geometric pattern of grooves and passages is so selected as to minimize pressure drops, bends, turns and kinks being avoided wherever possible.

For mass production purposes, consistency in fabrication and assembly are achieved and guess-work virtually eliminated, since the passages and ports may be drilled and milled according to precise and repetitive automatic machining operations. Maintenance, especially cleaning, is facilitated by reason of the manifold assembly being easily disassembled by removal of the screws fastening the various blocks together. Such screws pass through the end blocks 22 and 26, respectively, and are threaded into the respective opposite ends of central block 25. When disassembled, the various ports and passages are conveniently accessible for checking and cleaning.

While there have been described above the principles of this invention in connection with specific apparatus, it is to be clearly understood that this description is made only by way of example and not as a limitation to the scope of the invention.

What is claimed is:

1. Positive feed drill apparatus comprising a supporting frame which carries an elongated spindle for rotary and reversible longitudinal movement, drive means on said supporting frame for selectively imparting said movement to said spindle, said supporting frame including a U-shaped frame assembly of rigid blocks removably fixedly secured together, said drive means including a fluid powered motor on said supporting frame and fluid-operating means integrated with said frame assembly, one of the arms of said U-shaped frame assembly having an opening therein which receives said spindle for rotary and longitudinal movement, said spindle having opposite ends and being further mounted to traverse the distance between said arms and within the spaced defined by the exterior thereof such that said longitudinal movement results in one spindle end being movable toward and away from the other of said arms; said fluid-operating means including valves and passages with said passages being disposed internally of said frame assembly and said valve also being disposed internally with portions of certain valve being accessible externally thereof, said fluid-operating means controlling the starting and stopping of the motor, the advancement of said spindle and the depth of drilling, the retraction of said spindle and the limiting of the retractable movement thereof; said frame assembly including a central manifold body having opposite front and rear ends, a manifold plate fixedly superposed on said body, a front manifold block secured to the front end of said body which serves as one arm of said U-shape, and a rear manifold block secured to the rear end of said body which serves as the other arm of said U-shape, said body, plate, front and rear blocks each containing certain of said passages and being arranged to provide selectively fluid communication therebetween, said fluid-operating means being further characterized by having none of the passages thereof external of said frame assembly, and an air supply line extending between said frame assembly and said motor for controlling the operation of the latter.

2. The apparatus of claim 1 wherein said drive means includes a gear means connecting said motor to said spindle for imparting both rotary and longitudinal movement to said spindle, and piston means included within said fluid-operating means connected to said gear means and being selectively movable between first and second positions for controlling the advancement, retraction and rotation of said spindle, said valves including a pilot operated piston control valve, a pilot operated motor control value, and a pilot operated motor supply valve; said motor supply valve being contained within and said piston and motor control valves being mounted on said manifold body, certain of said passages being defined at the interfaces between said manifold body and plate and serving to provide selectively a supply of air to said piston and motor control valves and also to said motor supply valve.

3. The apparatus of claim 2 wherein said passages include an air outlet port in said manifold body in communication with said motor supply valve, a main air supply inlet port through said rear manifold block which communicates with said motor supply valve; said motor supply valve fitting within said manifold body immediately adjacent to said main air inlet port and being disposed in series with said main air inlet port and said outlet port, and said outlet port being connected to said air supply line to said motor.

4. The apparatus of claim 3 including two of said motor supply valves in side-by-side relation and being connected in parallel within the system of said passages, said main air supply port being elongated in cross-section and having opposed portions thereof in communication with said two supply valves, respectively.

5. The apparatus of claim 3 wherein said manifold body and plate have planar superposed interfaces, a planar gasket sealingly interposed between said interfaces, both said interfaces having coplanar grooves therein which are covered by said gasket thereby to form certain of said passages, said gasket further having a plurality of apertures which connect certain passages in said plate and body together.

6. The apparatus of claim 5 wherein said valves include a manually operable depth control valve mounted within said manifold body and having a manually accessible actuating element, said piston control valve being of the double pilot type, said depth control valve being in series with certain of said passages leading from the main air supply inlet port to one pilot of said piston control valve, said one pilot being operable to shift said piston control valve in a direction which causes said piston means to move to said second position and which stops advancement of said spindle.

7. The apparatus of claim 6 wherein said valves include a spindle-actuable depth control valve which is disposed within said front manifold block and operatively engageable by said spindle when it has advanced a predetermined distance, this last-mentioned depth control valve being series connected with certain passages in said front block, said manifold body and said manifold plate and otherwise in series between said one pilot and the pilot of said motor supply valve.

8. The apparatus of claim 7 wherein said passages include venting grooves in the interface of said manifold body which are covered and further defined by said gasket, said manifold body having control valve passages therethrough extending from the body interface to ports on the opposite face thereof, certain of said control valve passages connecting with said venting grooves and others with passages in said body and manifold plate interfaces, said piston and motor control valves being of the double pilot type and secured to said body surface with the ports thereof in registry with the ports of the control valve passages, respectively, certain of the ports of said control valves being adapted to have a supply of air under pressure connected thereto and the control valve passages corresponding thereto being connected by certain other passages to said main air supply inlet port, certain other ports of said control valves being adapted to be vented to atmosphere and the control valve passages corresponding thereto being connected to said venting grooves, and a further set of ports of said control valves being adapted to deliver air under pressure and the control valve passages corresponding thereto being selectively connected to certain other of said passages, said certain other passages including passages connecting said piston means and one pilot of said motor control valve together and to an air pressure delivery passage of said piston control valve and further including passages connecting an air pressure delivery passage of said motor control valve to the pilot of said motor supply valve.

9. The apparatus of claim 8 wherein said valves include a reverse limit valve in said rear manifold block and being operatively engageable by said spindle when it has moved longitudinally in reverse by a predetermined distance, said reverse limit valve being series connected by certain of said passages between another air delivery passage of said piston control valve and the other pilot of said motor control valve.

10. The apparatus of claim 9 wherein two one-way check valves are mounted within said manifold plate and are connected in series but in flow opposition by certain passages between said one pilot of said piston control valve and the other pilot of said motor control valve, and a manually operable stop valve mounted within said rear manifold block in communication with said main air supply inlet port and being connected by certain of said passages between said main air supply inlet port and to the passage in said manifold plate which connects said two check valves together, both of said check valves being polarized to admit flow from said stop valve to said one pilot of said piston control valve and said other pilot of said motor control valve.

11. The apparatus of claim 10 wherein said valves include a manually operable "start" and "stop" valves mounted in said rear block in fluid communication with said main air supply inlet port, and certain of said passages connecting said "start" valve in series between said main air supply inlet port and the other pilot of said piston control valve.

12. The apparatus of claim 11 wherein one of said passages opens at one end through the exterior of one of said manifold blocks, body or plate and at the other end communicates with the air output side of one of said "start" and "stop" valves whereby air under pressure may be introduced into the passages and valves of the fluid-operating means from a remote source in by-passing relation to such "start" or "stop" valve.

13. Positive feed drill apparatus comprising a supporting frame which carries an elongated spindle for rotary and reversible longitudinal movement, drive means on said supporting frame for selectively imparting said movement to said spindle, said supporting frame including a U-shaped frame assembly of rigid blocks removably fixedly secured together, said drive means including a fluid powered motor on said supporting frame and fluid-operating means integrated with said frame assembly, said fluid-operating means including valves and passages with said passages being disposed internally of said frame assembly and said valves also being disposed internally with portions of certain valves being accessible externally thereof, said fluid-operating means controlling the starting and stopping of the motor, the advancement of said spindle and the depth of drilling, the retraction of said spindle and the limiting of the retractable movement thereof; said frame assembly including a central manifold body having opposite front and rear ends, a manifold plate fixedly superposed on said body, a front manifold block secured to the front end of said body, and a rear manifold block secured to the rear end of said body, said body, plate, front and rear blocks each containing certain of said passages and being arranged to provide selectively fluid communication therebetween, said fluid-operating means being further characterized by having none of the passages thereof external of said frame assembly, and an air supply line extending between said frame assembly and said motor for controlling the operation of the latter.

14. The apparatus of claim 13 wherein said passages include an air outlet port in said manifold body in communication with said motor supply valve, a main air supply inlet port through said rear manifold block which communicates with said motor supply valve; said motor supply valve fitting within said manifold body immediately adjacent to said main air inlet port and being disposed in series with said main air inlet port and said outlet port, said inlet and outlet ports being directly connected together and having no obstruction therin to air flow except for said motor supply valve, and said outlet port being connected to said air supply line to said motor.

15. The apparatus of claim 13 including two of said motor supply valves in side-by-side relation and being connected in parallel within the system of said passages, said main air supply port being elongated in cross-section and having opposed portions thereof in communication with said two supply valves, respectively.

16. The apparatus of claim 13 wherein said manifold body and plate have planar superposed interfaces, a planar gasket sealingly interposed between said interfaces, both said interfaces having coplanar grooves therein which are covered by said gasket thereby to form certain of said passages, said gasket further having a plurality of apertures which connect certain passages in said plate and body together.

17. The apparatus of claim 13 wherein said valves include manually operable "start" and "stop" valves mounted in one of said blocks, said valves having air input and air output sides, said air input sides being in fluid communication with said main air supply inlet port, certain of said passages connecting said "start" valve in series between said main air supply inlet port and one pilot of one of said valves which is a piston control valve of the double pilot type, certain other of said passages connecting said "stop" valve in series between said main air supply inlet port and the other pilot of said piston control valve, two remote "start" and "stop" passages opening through the exterior of one of said blocks and communicating at the other ends thereof with the air output sides of the "start" and "stop" valves, respectively, whereby air under pressure may be introduced selectively into the last-mentioned passages from a remote source in by-passing relation to said "start" and "stop" valves.

18. The apparatus of claim 13 including threaded fasteners for securing said blocks, plate and gasket together in predetermined alignment, said passages and ports being accessible for cleaning upon removal of said fasteners and disassembly of said frame assembly.

19. The apparatus of claim 13 wherein certain of said passages in said rear block, said body and said plate are interconnected and otherwise have a connection to a main air supply port in one of said blocks, body and plate whereby these last-mentioned passages may be charged with a supply of air connected to said supply port, and said last-mentioned passages having branches leading selectively to selected ones of said valves.

* * * * *